Figure 1:
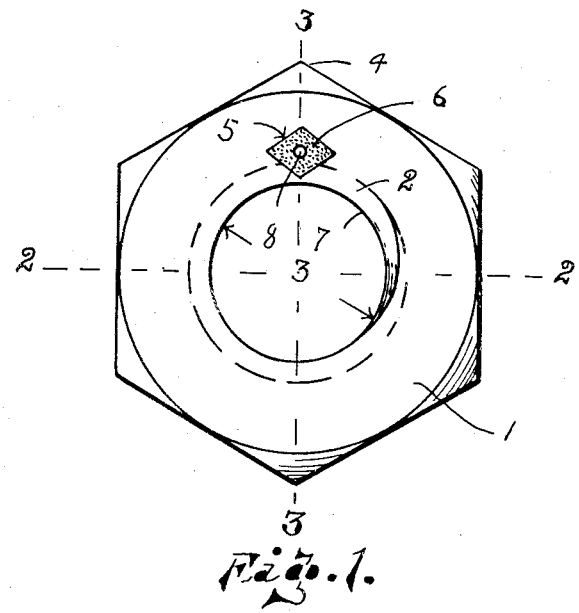

July 30, 1946.   B. A. CLAUSON   2,405,088
SAFETY NUT
Filed Dec. 18, 1944

INVENTOR.
Bernard A. Clauson.
BY Geo. Stevens.
Atty.

Patented July 30, 1946

2,405,088

UNITED STATES PATENT OFFICE 2,405,088

SAFETY NUT

Bernard A. Clauson, Duluth, Minn.

Application December 18, 1944, Serial No. 568,604

2 Claims. (Cl. 151—7)

This invention relates to an internally screw threaded nut for cooperation with a similarly externally screw threaded member and has special reference to that type of nut which may be aptly termed a safety nut rather than the commonly referred to lock nut.

It is well known that there are several somewhat similar inventions patented for a like purpose; however the instant invention is deemed superior in many respects to such former types, and the advantages of which will be clearly pointed out in the specifications and appended claims.

The principal object of the present invention is that of providing a novel form, particularly in cross section, of key and channel therefor to augment the efficiency thereof for the purpose intended.

Other objects and advantages of the invention may appear in the further description thereof.

Figure 2:
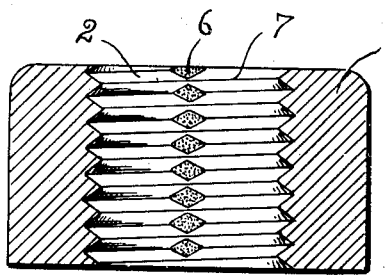
Figure 3:
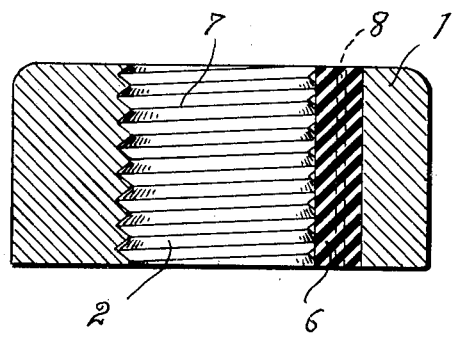

Referring now to the accompanying drawing forming a part of this application wherein like reference characters indicate like parts;

Fig. 1 is a top plan view of a common nut illustrating one form of the invention as applied thereto, Fig. 2 is a cross sectional view of the nut taken on the line 2—2 of Fig. 1, and Fig. 3 is a cross sectional view on the line 3—3 of Fig. 1.

In the drawing, the reference character 1 represents a common metal nut which, of course, may be of any size, shape, or character of metal. Illustrated at 2 are the internal screw threads surrounding the central bore 3 both of which are common to such nuts.

Preferably in line radially with one corner 4 of the nut where ample stock is provided, a channel or auxiliary bore keyway 5 of diamond shape in cross section extending the entire depth of the nut is formed, the same being so positioned that the obtuse angles of the channel are in radial alignment with respect to the center of the nut. Materially less than one-half of said radial measurement of the channel occurs through the roots of the threads 2 of the nut thereby leaving an ample amount of the apexes of the threads to not jeopardize in any way the efficiency of same when screwed either off or on a member similarly, but externally of course, screw threaded.

Within the bore or keyway 5 is snugly fitted, preferably by its own resiliency, a rubber key 6 having yielding properties determined suitable for the purpose; thus resulting in a portion of said key extending within the bore 3 of the nut and intermediate of each pair of thread apexes 7 of the threads 2 so that as the nut is applied to its cooperative member, the threads of the latter will frictionally engage portions of the rubber key resulting in the desired function of such an equipped nut.

It may be here stated that experiments have been made with somewhat similar keys that extend through the apexes of the threads of the nut, but they were found not to function properly in that portions of the rubber of the key were severed and drawn in between the threads and materially interfered with the functioning of the nut.

It may also be stated that a cylindrical form of a rubber key is not satisfactory due to its rolling about in the channel holding same; while a diamond shaped channel prevents any such rolling and insures a positive frictional engagement with the apexes of the threads of the member to which the nut is to be applied.

While I have shown but one form of keyway practical for the embodiment of the invention, it is to be noted that the cross sectional design may be altered materially but obviously always of equilateral shape, the keyway 5 and the rubber key 6, for example, being square in cross section with one angle thereof exposed within the bore 3 of the nut. This provides means whereby the rubber key may be removed when the exposed portion is sufficiently worn, rotated say ninety degrees, and then inserted back into the keyway.

Obviously then, if the bore and key are of square cross section, the key may be used for four different changes as wear may demand; whereas, the diamond shaped cross section, though an equilateral, is susceptible of but two changes for such purpose.

Another feature of the invention is that means for assistance in changing, when required, the position of the key within the way as above described, is provided by having the key formed with a small axial hole as indicated at 8 for reception of a wire or the like in pulling the key either into or from the keyway.

Having thus described my invention, what I claim and desire to secure by Letters Patent is:

1. Means for retaining an internally screw threaded nut upon a similarly externally screw threaded member comprising a bore of diamond shape in cross section directed transverse the roots of the threads in said nut with the obtuse angles of said bore aligned radially in respect to the axis of said nut to provide a plurality of angular anchoring channels longitudinally of said bore and an integral rubber core of diamond shape in cross section anchored within said bore with an obtuse angular portion thereof extending inwardly and intermediate of the roots of each pair of threads of said nut.

2. Means for retarding movement of an internally screw threaded nut upon a similarly externally screw threaded member comprising an auxiliary bore of angular shape in cross section extending parallel with the axis of said nut and through the roots of the threads adjacent said bore and forming a plurality of acute angular channels longitudinally the walls of said bore to prevent rotation of means held therewithin, said last mentioned means comprising a resilient key held within said bore and having longitudinal angular walls fitting snugly within the like angular channels of said bore and another of said angular walls extending into the path of cooperative threads when traversing the threads of said nut whereby when said last mentioned angular wall of said key becomes worn from repeated frictional engagement with said cooperating threads, said key may be withdrawn longitudinally, partly rotated, and returned into said bore so as to install an unused angular portion of said key within the path of said cooperating threads thus extending the useful life of said key.

BERNARD A. CLAUSON.